United States Patent [19]

Wilkinson

[11] Patent Number: 4,680,766
[45] Date of Patent: Jul. 14, 1987

[54] DECODING DIGITAL DATA

[75] Inventor: James H. Wilkinson, Basingstoke, United Kingdom

[73] Assignee: Sony Corporation, Tokyo, Japan

[21] Appl. No.: 723,287

[22] Filed: Apr. 15, 1985

[30] Foreign Application Priority Data

May 16, 1984 [GB] United Kingdom ............... 8412500

[51] Int. Cl.⁴ .................................. H04N 5/93
[52] U.S. Cl. .......................... 371/47; 371/42; 375/114; 358/339
[58] Field of Search ............ 371/47, 42, 39, 40; 375/111, 113, 114; 370/106; 328/75; 358/339; 360/70, 38.1

[56] References Cited

U.S. PATENT DOCUMENTS

| | | | |
|---|---|---|---|
| 4,211,997 | 7/1980 | Rudnick | 371/51 X |
| 4,353,130 | 10/1982 | Carasso | 375/114 |
| 4,361,898 | 11/1982 | Griffiths | 375/114 |
| 4,486,780 | 12/1984 | Ive | 358/339 X |
| 4,506,262 | 3/1985 | Vance | 375/114 X |
| 4,525,840 | 6/1985 | Heinz | 371/47 |
| 4,573,171 | 2/1986 | McMahon | 375/114 |

FOREIGN PATENT DOCUMENTS 93527 9/1983 European Pat. Off. .

OTHER PUBLICATIONS

R. W. King, "Missing Address Mark Detector for Disk Files", IBM Tech. Disclosure Bulletin vol. 14, No. 8 1/1972.

Primary Examiner—Jerry Smith
Assistant Examiner—Robert W. Beausoliel, Jr.
Attorney, Agent, or Firm—Lewis H. Eslinger; Alvin Sinderbrand

[57] ABSTRACT

In a method of or apparatus for decoding incoming digital data which includes respective synchronizing codes and address codes associated with successive data blocks, the address codes including respective data block addresses which increase by one from data block to data block, the incoming digital data is checked to locate the positions of the synchronizing codes, successive address codes are checked to ascertain if the block addresses increase by one from one address code to the next, and if the block address does increase by one from one address code to the next, the incoming digital data is aligned using the synchronizing codes, for subsequent decoding of the data blocks.

9 Claims, 3 Drawing Figures

DECODING DIGITAL DATA

BACKGROUND OF THE INVENTION

1. Field of the Invention

This invention relates to methods of and apparatus for use in decoding digital data which includes synchronizing codes and address codes. More particularly, but not exclusively, the invention relates to the decoding of audio and/or video data in digital form.

2. Description of the Prior Art

In the case, for example, of a video signal which has been put into digital form by sampling an incoming video signal and pulse code modulating the resulting samples to form data words, it is usual to assemble the data words into blocks. Associated with each data block is a synchronizing code and an address code, the address code including a block address. The resulting serial digital data may then be transmitted over a signal path or recorded and reproduced using a digital video tape recorder.

On reception or reproduction the digital data is supplied to a decoder. The functions of the decoder include identification of the synchronizing code and decoding of the address code. Identification of the synchronizing code enables the position of the address code and associated data blocks in the serial stream to be determined. The decoding of the address codes enables the data blocks to be attributed to their correct positions in the video field or frame. It is usual to provide the decoder with a flywheel circuit which, once locked to the incoming synchronizing codes, will continue to generate the synchronizing and address codes during any short break in the incoming synchronizing and address codes and caused, for example, by drop-out in a digital video tape recorder. The provision of such a flywheel circuit does not significantly reduce the need to achieve a high probability of correctly identifying incoming synchronizing and address codes; not least so that the flywheel circuit can be quickly and accurately locked.

In addition to total loss of incoming data for short periods due to drop-out on reproduction from a digital video tape recorder, recording and/or reproduction or any transmission or processing of the data will inevitably result in some random errors. So far as the data words in a digital video signal are concerned, it is now usual to use error correction codes, some of which are capable of achieving very high levels of correction of random errors. As a result, circumstances now arise where the largest source of error in the decoded signal is the failure of the decoder correctly to identify the synchronizing and address codes in the presence of random errors. This indicates that some form of protection against random errors in the synchronizing and address codes is required, but it is also important that the protection is obtained without an excessive overhead in the form of redundant data included solely to provide for error correction.

SUMMARY OF THE INVENTION

One object of the present invention is to provide a method of synchronizing incoming digital data, which method is resistant to random errors in the incoming synchronizing codes.

Another object of the present invention is to provide a method of synchronizing incoming digital data, which method makes use of both synchronizing codes and address codes contained in the incoming digital data.

Another object of the present invention is to provide a method of synchronizing incoming digital data, which method includes checking the progression of address codes contained in the incoming digital data from one data block to the next.

According to the present invention there is provided a method of decoding incoming digital data which includes respective synchronizing codes and address codes associated with successive data blocks, the address codes comprising respective data block addresses which increase by one from data block to data block, the method comprising: checking the incoming digital data to locate the positions of said synchronizing codes; then checking successive address codes to ascertain if said block address is increased by one from one address code to the next; and if said block address is increased by one from one address code to the next, aligning said incoming digital data using said synchronizing codes, for subsequent decoding of said data blocks.

According to the present invention there is also provided apparatus for use in decoding incoming digital data which includes respective synchronizing codes and address codes associated with successive data blocks, the address codes comprising respective data block addresses which increase by one from data block to data block, the apparatus comprising: a synchronizing code decoder for checking the incoming digital data to locate the positions of said synchronizing codes; an address comparison circuit for checking successive address codes to ascertain if said block address increases by one from one address code to the next; and means operative if said block address increases by one from one address code to the next for aligning said incoming digital data using said synchronizing codes, for subsequent decoding of said data blocks.

The above, and other objects, features and advantages of this invention will be apparent from the following detailed description of illustrative embodiments which is to be read in connection with the accompanying drawings.

DESCRIPTION OF THE PREFERRED EMBODIMENTS

The video signal which is to be recorded using a digital video tape recorder is sampled, and the resulting samples are pulse code modulated to form data words. The data words and associated error correcting codes are assembled into data sub-blocks each comprising sixty-six 8-bit words. The data sub-blocks are then assembled in pairs to form data blocks, with each of which is then associated a synchronizing code and an address code to form a so-called sync block.

Each synchronizing code consists of the same sixteen bits, the pattern of these bits having been selected in known manner to be one which is statistically most unlikely to occur in the address codes and data blocks.

Figure 1:
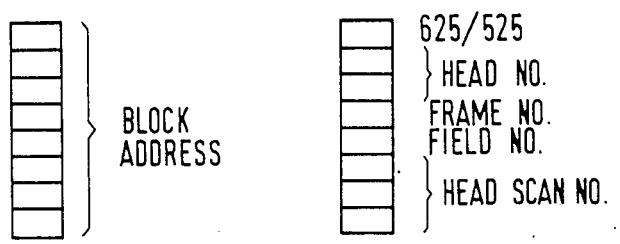
FIG. 1 shows the format of an address code in a digital video signal.

Each address code consists basically of sixteen bits which can be considered as two groups of eight bits, these bits being assigned as indicated in FIG. 1 to which reference is now made. Thus, the less significant eight bits represent the block address, which is a number which cycles through the range 0 to 169, increasing by one for each successive sync block. Of the eight more significant bits, the first, most significant bit indicates whether the video signal relates to a 625 or a 525-line television system, the second and third bits represent the head number in the digital video tape recorder, the fourth bit represents the frame number, the fifth bit represents the field number, and the sixth to eighth bits represent the head scan number in the range 0 to 5 for a 625-line or from 0 to 4 for a 525-line television system. Although not specifically referred to herein, the audio signal associated with the video signal is processed into a similar format for recording, or indeed an audio signal without a video signal can be processed into a generally similar form for recording.

To protect against random errors, both the synchronizing codes and the address codes are provided with error correction. Protection of the address codes will be considered first.

The sixteen bits of each address code are split into four 4-bit codes. Each 4-bit code then has error correction added in the form of a four to eight code. The code selected additionally eliminates dc components, so making the address codes more suitable for magnetic recording and reproduction, by consisting of four "1"s and four "0"s. Thus, the 16-bit address code becomes thirty-two bits when encoded for error correction. The four to eight code does not provide the full sixteen ($2^4$) values, but only fourteen values as indicated by the following table:

TABLE

| 0 | 0001 | 1011 |
|---|------|------|
| 1 | 0010 | 1110 |
| 2 | 0011 | 0101 |
| 3 | 0100 | 0111 |
| 4 | 0101 | 1100 |
| 5 | 0110 | 1001 |
| 6 | 0111 | 0010 |
| 7 | 1000 | 1101 |
| 8 | 1001 | 0110 |
| 9 | 1010 | 0011 |
| A | 1011 | 1000 |
| B | 1100 | 1010 |
| C | 1101 | 0001 |
| D | 1110 | 0100 |

Referring again to FIG. 1, it will be seen that fourteen values, rather than the full sixteen values, are sufficient to accommodate all the required address codes; because the block address has 170 values and the remaining eight bits have a maximum of 192 code values made up of thirty-two for the first five bits times a maximum of six for the last three bits, whereas $14^2$ is 196.

This address coding format allows correction of each 8-bit word in the address code, but to use this to the full would significantly reduce the security of the decoding procedure. The mode of correction chosen from the available options is to allow only one error in the whole 32-bit address code. As there are approximately $2^{15}$ bits of address information ($\log_2(192 \times 170)$) then with a 32-bit address code, the decoding security with no error correction is $32-15=17$ bits. There are thirty-two possible positions for a single error, and therefore the number of valid address codes is increased by $2^{15} \times 32$. This results in a decoding security of approximately $32-15-5=12$ bits. This will be further referred to below.

Figure 2:
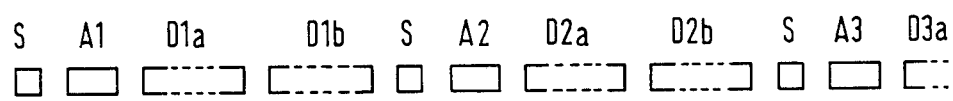
FIG. 2 shows the format of the digital video signal.

Protection of the synchronizing codes will now be considered. As shown in FIG. 2, the serial stream of data for decoding consists of successive sync blocks comprising respective successive data blocks formed by pairs of data sub-blocks D1a, D1b, D2a, D2b, etc, with each pair of which is associated an unchanging 16-bit synchronizing code. In each sync block there is also a changing 32-bit address code A1, A2, A3, A4, etc, as already described. Of particular relevance in the present context is that within successive address codes A1, etc, the block address increases by one.

When testing for the 16-bit synchronizing code after reproduction, two such sequential synchronizing codes are required for successful decoding. This extends the effective length of the synchronizing code to thirty-two bits. There is then a 1 in $2^{32}$ probability of a match, that is of a pair of 16-bit sequences being indentical with the synchronizing code. Effectively error correction is provided by using a majority logic decoding circuit which when testing for the 32-bit synchronizing code is satisfied if at least thirty-one bits out of thirty-two match. As a consequence of this the probability of incorrectly decoding will be 33 (that is approximately $2^5$) in $2^{32}$, which is approximately 1 in $2^{27}$. This level of security against incorrect decoding is not in itself high enough, so to increase the security, the address code is also decoded at this stage and a check is made for the presence of two sequential block addresses.

If the current address is compared with the previous address, then only one previous address value is possible. The single error correction in this previous address increases the number of valid codes by a factor of thirty-three. Hence the security of decoding is reduced from thirty-two bits to approximately twenty-seven bits. Since the sequential addresses form a pair, the probability of decoding a correct address pair erroneously is $2^{-12} \times 2^{-27} = 2^{-39}$. Hence the probability of falsely decoding the address is limited to once every $2^{39}$ sync blocks, and since there are for normal data rates for a video signal very approximately half a million sync blocks every second, the probability of decoding an erroneous address is once in some three to four hundred hours.

Moreover, if the synchronizing code has been correctly located, then the address decoding should work, and if an erroneous synchronizing code has been detected, then the additional check provided by the address codes will provide the necessary security. To cause both the synchronizing and address codes to be erroneously detected requires a very high degree of chance. The probability is a product of the failure of the synchronizing and address codes independently, that is $2^{-27} \times 2^{-39} = 2^{-66}$. At a data rate of 250M-bits/second, the probability of this happening is somewhat less than one in one hundred million years.

Figure 3:
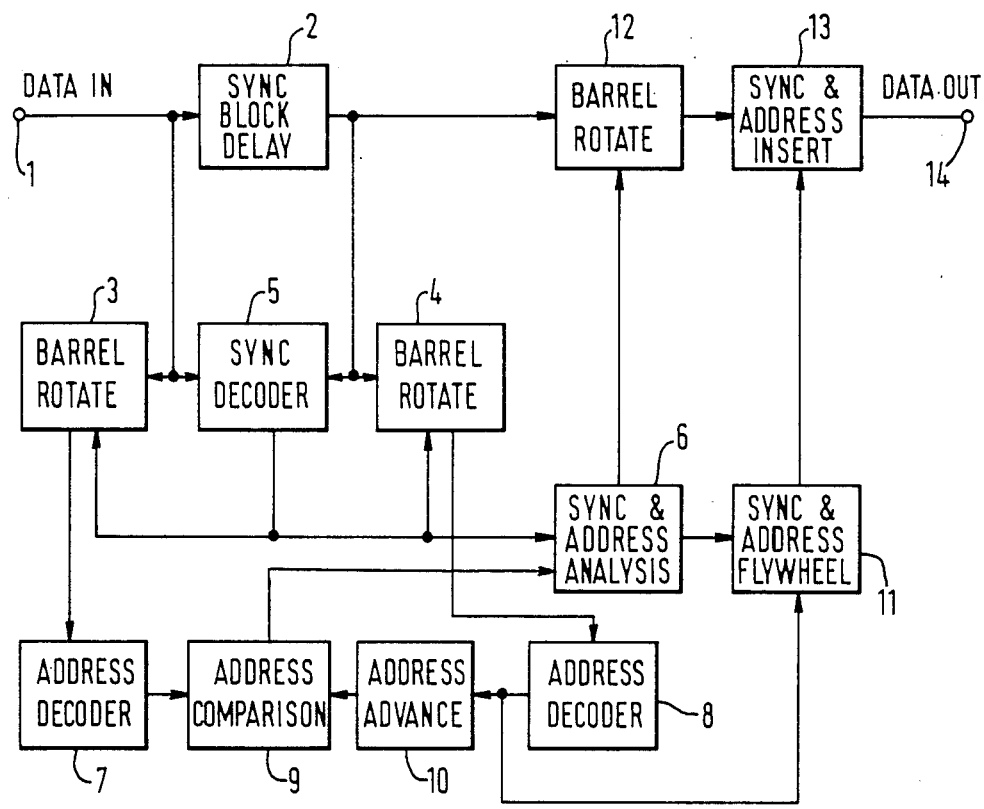
FIG. 3 shows in block form an embodiment of apparatus for use in decoding the digital video signal.

The embodiment of apparatus for use in decoding the digital video signal will now be described with reference to FIG. 3. The apparatus comprises an input 1 to which the input data formed by the digital video signal after reproduction or transmission is supplied. The input 1 is connected to a sync block delay 2 from the input and output of which the data is supplied to respective barrel rotation circuits 3 and 4, and respective inputs of a synchronizing code decoder 5. The synchronizing code decoder 5 supplies control signals to the barrel rotation circuits 3 and 4, and also to a synchronizing and address code analysis circuit 6. The barrel rotation circuits 3 and 4 supply outputs to respective address decoders 7 and 8, each of which supplies decoded block addresses to respective inputs of an address comparison circuit 9, the block address supplied by the address decoder 8 first being increased by one by an address advance circuit 10. The address comparison circuit 9 supplies a control to the synchronizing and address code analysis circuit 6, while the block address from the address decoder 8 is supplied to a synchronizing and address code flywheel circuit 11. The synchronizing and address analysis circuit 6 supplies a control signal to a further barrel rotation circuit 12 which receives the data from the output of the sync block delay 2 and supplies the data to a synchronizing and address code insertion circuit 13 which receives the necessary synchronizing and address codes for insertion into the data from the synchronizing and address code flywheel circuit 11. The synchronizing and address code insertion circuit 13 supplies output data including inserted synchronizing and address codes to an output 14 for subsequent processing to decode the data and derive the video signal.

The operation will now be described. Initially, the input data supplied to the input 1 probably does not have the bit sequence of the 8-bit words aligned, but the sync block delay 2 supplies signals to the synchronizing code decoder 5 at the necessary spacing, and the synchronizing code decoder 5 causes the data to be barrel rotated by the barrel rotation circuits 3 and 4 in accordance with the phase of the synchronizing code detected by programmable read-only memories of the decoder 5, until the decoder 5 correctly indentifies at least thirty-one bits of the 3=-bit synchronizing code.

The output of each of the barrel rotation circuits 3 and 4 is then eight to four decoded by the address decoders 7 and 8 respectively, each of which may comprise a programmable read-only memory which will decode the address code and identify and correct any single errors, adding a flag signal to indicate that this has been done. The detection of two errors may also be indicated by a different flag signal, although the accuracy of this detection cannot be independently guaranteed. The address comparison circuit 9 then compares the two successive block addresses derived by the address decoders 7 and 8, the block address supplied by the address decoder 8 first being advanced by one by the address advance circuit 10. The result of the comparison, together with the error flags mentioned above, are then supplied to the synchronizing and address code analysis circuit 6, which may comprise a further programmable read-only memory, for error analysis. If the later block address has been found to be one more than the preceding block address, and no errors were detected or only a single error was detected and corrected, then the eight to four decoded 16-bit address code from the address decoder 8 is loaded into the synchronizing and address code flywheel circuit 11. Likewise, a data start pulse derived from the synchronizing code decoder 5 causes the synchronizing code to be loaded into the synchronizing and address code flywheel circuit 11. The synchronizing and address code analysis circuit 6 also supplies a signal to the barrel rotation circuit 12 to confirm the correct rotation of the data. The synchronizing and address code flywheel circuit 11 then supplies the synchronizing and address codes to the synchronizing and address code insertion circuit 13 for insertion into the data in place of the original synchronizing address codes, before the data is supplied to the output 14.

The very high degree of security referred to above assumes that the digital video signal is being reproduced at the normal speed, but it is also high enough for very satisfactory operation in slow motion modes, and moreover the window which is checked to locate the synchronizing codes and the address codes, amounting as it does to only slightly more than one sync block, is short enough for satisfactory operation in high speed modes.

Various modifications are of course possible, and in particular the numbers of bits in the synchronizing and address codes and the number of data words in the data blocks can be varied without departing from the appended claims.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of decoding incoming digital data provided at a high data rate from a digital video tape recorder or the like and which includes respective synchronizing codes and address codes associated with successive data blocks, the address codes comprising respective data block addresses which increase by one from data block to data block, the method comprising:

checking the incoming digital data to locate the positions of said synchronizing codes;

then checking successive address codes to ascertain if said block address is increased by one from one address code to the next; and if said block address is increased by one from one address code to the next, aligning said incoming digital data using said synchronizing codes for subsequent decoding of said data blocks, to insure rapid and correct identification of incoming synchronizing and address codes while minimizing redundant bits.

2. A method according to claim 1, wherein said synchronizing code includes n bits and said step of checking the incoming digital data to locate the positions of said synchronizing codes uses a majority logic decision to achieve a single error correcting code in which a bit pattern having n-1 of its bits identical with the corresponsing bits of said synchronizing code is deemed to be said synchronizing code.

3. A method according to claim 1 wherein said address codes include an error detection and correction code, and said step of checking successive address codes to ascertain if said block address increases by one from one address code to the next is disabled if said error detection and correction code detects more than one error in the associated address code.

4. Apparatus for decoding incoming digital data provided at a high data rate from a digital tape video recorder or the like and which includes respective synchronizing codes and address codes associated with successive data blocks, the address codes comprising respective data block addresses which increase by one from data block to data block, the apparatus comprising:

a synchronizing code decoder for checking the incoming digital data to locate the positions of said synchronizing code;

an address comparison circuit for checking successive address codes to ascertain if said block address increases by one from one address code to the next; and means operative if said block address increases by one from one address code to the next for aligning said incoming data using synchronizing codes for subsequent decoding of said data blocks, to insure correct and rapid identification of the incoming synchronizing and address codes while minimizing redundant bits.

5. Apparatus according to claim 4, wherein said synchronizing code includes n bits and said synchronizing code decoder comprises majority logic operative to achieve a single error correcting code in which a bit pattern having n-1 of its bits identical with the corresponding bits of said synchronizing code is deemed to be said synchronizing code.

6. Apparatus according to claim 4, wherein said address codes include an error detection and correction code, and said means for aligning is disabled if said error detection and correction code detects more than one error in the associated address code.

7. Apparatus according to claim 6 wherein said error detection and correction code makes use of four bit to eight bit coding of said block addresses.

8. Apparatus according to claim 4, wherein said means for aligning further includes means for inserting locally generated synchronizing and address codes into said aligned incoming digital data, said means for inserting being locked to the incoming synchronizing codes located by said synchronizing code decoder and to said incoming address codes supplied to said address comparison circuit.

9. Apparatus according to claim 4 wherein said digital data is video data.

* * * * *